United States Patent [19]

Nakao et al.

[11] Patent Number: 4,707,600

[45] Date of Patent: Nov. 17, 1987

[54] MARK SENSOR DEVICE WITH ONE-DIMENSIONAL IMAGE POSITION SENSOR

[75] Inventors: Tadashi Nakao, Nara; Toshitsugu Sawai, both of Nara, Japan

[73] Assignee: Sharp Kabushiki Kaisha, Osaka, Japan

[21] Appl. No.: 20,241

[22] Filed: Mar. 2, 1987

Related U.S. Application Data

[63] Continuation of Ser. No. 711,001, Mar. 12, 1985, abandoned.

[30] Foreign Application Priority Data

Mar. 13, 1984 [JP] Japan ................................. 59-48528

[51] Int. Cl.⁴ .......................... H01J 5/16; H01J 40/14
[52] U.S. Cl. .................................... 250/227; 250/561
[58] Field of Search ............... 250/227, 561, 548, 557; 356/400, 401; 350/96.1

[56] References Cited

U.S. PATENT DOCUMENTS 3,412,255 11/1968 Krieger ................................. 250/227
3,549,895 12/1970 Sidorsky ............................... 250/227
3,571,796 3/1971 Brugger ................................ 250/227
3,790,276 2/1974 Cook et al. ...................... 250/203 R
4,304,630 12/1981 Tanner ................................. 250/227
4,482,805 11/1984 Palmer ................................. 250/227

Primary Examiner—David C. Nelms
Assistant Examiner—William L. Oen
Attorney, Agent, or Firm—Birch, Stewart, Kolasch & Birch

[57] ABSTRACT

A mark sensor device which is small and convenient in mounting is disclosed. The mark sensor device contains an image data transmitter made of a plurality of optical fibers in a bundle positioned between the object mark and the image sensor, and uses a one-dimensional image sensor. The ends of the plurality of optical fibers on one end of the image data transmitter are arranged in a square shape. The other ends of the plurality of optical fibers on the other end of the image data transmitter are arranged along a line. The one-dimensional image sensor is aligned correspondingly with the linearly aligned ends of the plurality of optical fibers. Accordingly, the light including the optical image of the object mark irradiates the one end of the image data transmitter, travels through the transmitter and comes out from the other end of the transmitter. Thus, the brightness of the light is detected by the one-dimensional image sensor for accurate positioning of the object mark.

4 Claims, 8 Drawing Figures

FIG. I
CONVENTIONAL ART
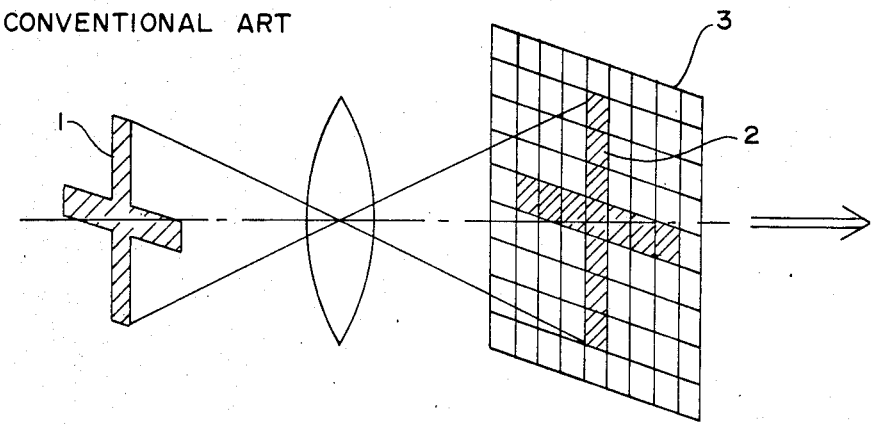
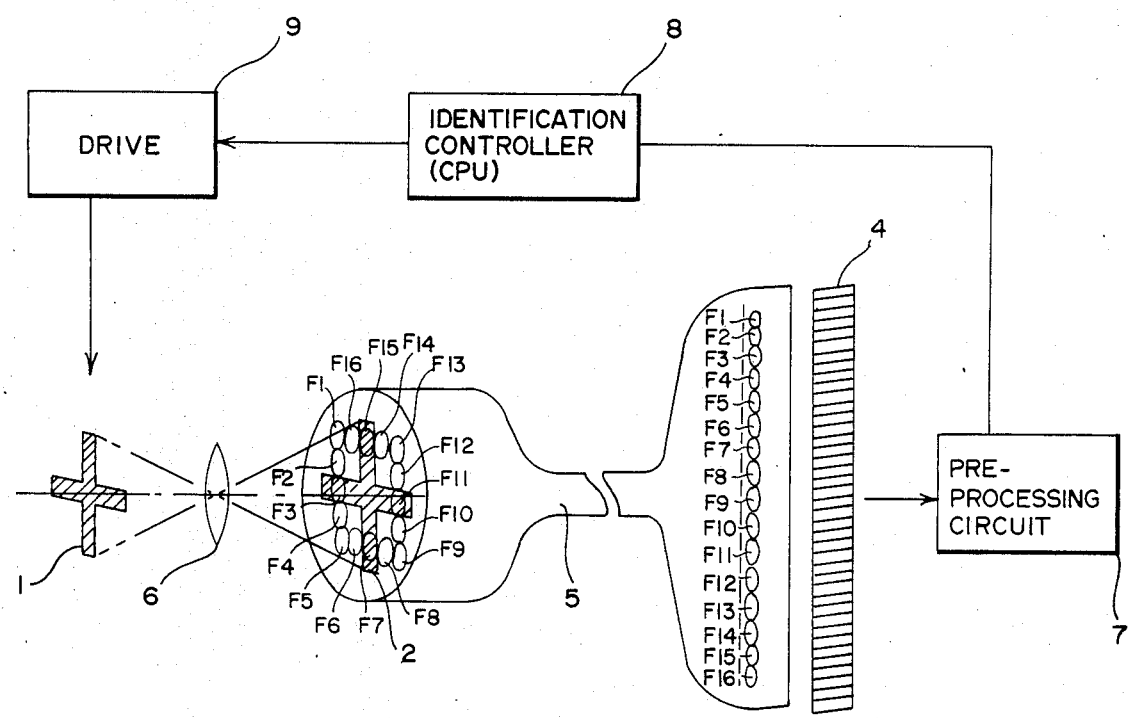
FIG. 2

MARK SENSOR DEVICE WITH ONE-DIMENSIONAL IMAGE POSITION SENSOR

This application is a continuation, of application Ser. No. 711,001 filed on Mar. 12, 1985, now abandoned.

BACKGROUND OF THE INVENTION

The present invention relates to a mark sensor device for sensing the brightness of an optical image of an object mark with an image sensor and converting the brightness into an electrical signal.

FIG. 1 schematically shows a conventional mechanism for sensing a mark subjected to image processing, in which mechanism the object mark 1 is required to be positioned at all times in a specified location. To this end, it is necessary to accurately detect the present position of the object mark 1. Conventionally, the position of the object mark 1 has been detected in the following manner: A plane containing the optical image 2 of the object mark 1 is divided by a number of vertical and horizontal lines into small picture elements. Then, the brightness of each picture element is sensed by a two-dimensional image sensor 3. The optical image is then converted into an electrical signal for detection of the position of the object mark 1.

The conventional mark sensing mechanism described above has disadvantages. Specifically, since there are many picture elements, processing of electrical signals from the two-dimensional image sensor 3 involves complicated software and hardware, which in turn results in slow signal processing speed. In addition, this mechanism involves complicated and large-scale hardware as well as a two-dimensional image sensor 3, resulting in a large mark sensing device which is inconvenient in mounting and expensive in cost.

OBJECT AND SUMMARY OF THE INVENTION

The primary object of the present invention is to provide a mark sensor device small in size and convenient in mounting.

In brief, the present invention provides a mark sensor device in which an image data transmitter composed of a plurality of optical fibers in a bundle is positioned between an object mark and an image sensor, the image sensor being one-dimensional. On one end of the image data transmitter, the ends of the plurality of optical fibers are arranged in a square, while on the other end of the image data transmitter, they are arranged along a line. The one-dimensional image sensor is positioned correspondingly to the linearly aligned ends of the optical fibers. Hence, the light containing the optical image of an object mark irradiates one end of the image data transmitter, passing through the transmitter to come out from the other end thereof. The brightness is then sensed by the one-dimensional image sensor. Thus, the position of the object mark is accurately detected.

According to the present invention, as mentioned above, the brightness of the light emitted from the linearly aligned optical fibers is sensed and converted into an electrical signal by the one-dimensional image sensor. Consequently, the number of picture elements is smaller and the signal processing hardware and software are more simplified than in the conventional device. Moreover, the signal processing speed is faster and the cost of the device is lower. Further, the simplified hardware and the one-dimensional image sensor make it possible to realize a small sensor device which is convenient in mounting. The optical fibers also facilitate in mounting the device.

BRIEF DESCRIPTION OF THE DRAWINGS

FIG. 1 schematically shows a conventional mechanism for sensing an object mark subjected to image processing.

FIG. 2 schematically illustrates a mark sensor device according to the present invention.

DETAILED DESCRIPTION OF THE INVENTION

An example of the present invention is described below with reference to FIGS. 2 to 5.

Figure 3A:
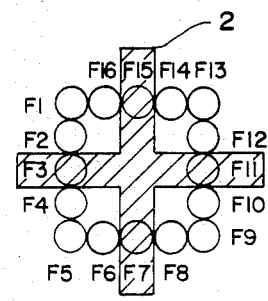
FIG. 3 shows arrangements of the optical fibers on each end of the image data transmitter, together with an optical image, FIG. 3(a) showing their arrangement on one end of the image data transmitter, FIG. 3(b) showing their arrangement on the other end thereof.
Figure 3B:

A mark sensor device according to the present invention is schematically shown in FIG. 2 in which a "+" mark is used as an object mark 1 subjected to image processing. As shown, the image data transmitter 5 consisting of a plurality of optical fibers F1–F16 in a bundle is interposed between the object mark 1 and the image sensor 4. The ends of the optical fibers F1–F16 are arranged in a square on one end of the image data transmitter 5 as shown in FIG. 3(a). The other ends of the optical fibers F1–F16 are arranged along a line on the other end of the image data transmitter 5 as shown in FIG. 3(b). As an image sensor 4, a one-dimensional image sensor is provided corresponding to the linearly aligned ends of the optical fibers F1–F16.

Referring to FIG. 2, the light containing the optical image 2 of the object mark 1 is irradiated through a lens 6 on the one end of the image data transmitter 5. The irradiated light passes through the image data transmitter 5, coming out from the other end thereof. The one-dimensional image sensor 4 senses the brightness of the light emitted from the transmitter and converts it into an electrical signal which is then processed by a preprocessing circuit 7 and an identification controller (CPU) 8 to identify the position of the mark "+". The object mark 1 is accordingly shifted to an accurate position by a driving unit 9.

Referring to FIGS. 2 and 3, the object mark 1 is supposedly positioned at a correct place. Adjustment is made in advance so that the optical image 2 of the object mark 1 is caught by the optical fibers F3, F7, F11 and F15 on the one end of the image data transmitter 5, and this adjustment is stored in memory. The brightness of the optical fibers F3, F7, F11 and F15 is reduced when they catch the optical image 2. In other words, if the brightness of the optical fibers F3, F7, F11 and F15 is lower than that of the rest of the optical fibers, the object mark 1 is in the proper position, which is detected by the one-dimensional image sensor 4.

Figure 4A:
FIG. 4 is a similar illustration with FIG. 3 except that the arrangement of the optical fibers on the other end of the image data transmitter is shown in (a), that on the one end of the image data transmitter shown in (b).
Figure 4B:
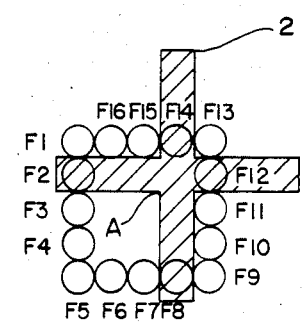

When the brightness of the optical fibers F2, F8, F12 and F14 is reduced as shown in FIG. 4(a), the sensor device detects that the optical image 2 of the object mark is positioned as shown in FIG. 4(b). In this case, the object mark 1 is shifted so that the optical image 2 moves in the direction indicated by the arrow A to the position as shown in FIG. 3(a).

Figure 5A:
FIG. 5 is an illustration similar to FIG. 4, in which (a) shows the arrangement of the optical fibers on the other end of the image data transmitter, and (b) shows that on the one end thereof.
Figure 5B:
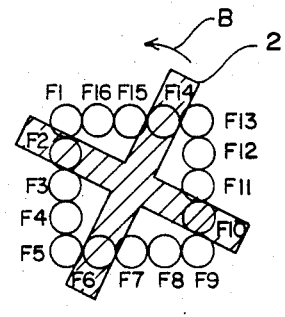

Alternatively, if the brightness of the optical fibers F2, F6, F10 and F14 is reduced as shown in FIG. 5(a), it is detected that the optical image 2 slants as illustrated in FIG. 5(b). In this case, the position of the object mark 1 is adjusted so that the optical image 2 rotates in the direction indicated by the arrow B.

The center of the optical image 2 is offset in FIG. 4, and the optical image 2 slants in FIG. 5. The optical image 2 may slant with its center offset (not shown). The position detection and accurate positioning are also possible with such a slant and offset optical image.

This invention should not be considered to be limited to the above example. The invention may be embodied in various modified forms. For example, the object mark 1 may be "−" instead of "+" used in the above example. Any other known simple figures may be used as an object mark 1, with the input ends of the optical fibers of the image data transmitter arranged accordingly. Further, the present invention may be used for positioning a product which contains one of these figures as a position detecting mark.

What is claimed is:

1. A mark sensor device for sensing the position of an optical image of an object mark of a predetermined shape with an image sensor and converting said sensed position into an electrical signal, comprising:

an image data transmitter composed of a plurality of optical fibers in a bundle being interposed between said object mark and said image sensor;

the ends of said plurality of optical fibers on one end of said image data transmitter being arranged in a predetermined two-dimensional geometrical shape;

the ends of said plurality of optical fibers on the other end of said image data transmitter being arranged along a line;

said image sensor being a one-dimensional image sensor correspondingly aligned with said linearly aligned ends of the plurality of optical fibers;

whereby light containing the optical image of said object mark is irradiated on said one end of the image data transmitter, transmitted therethrough and emitted from said other end thereof so that the one-dimensional image sensor detects the brightness of the emitted light, and produces an electrical signal corresponding to the position of said object mark.

2. A mark sensor device as claimed in claim 1, wherein said predetermined two-dimensional geometrical shape is a square.

3. A mark sensor device for detecting the position of an object mark, comprising:

image data transmitter means for sensing the brightness of an optical image of said object mark, including a plurality of optical fibers arranged in a bundle, the ends of said plurality of fibers at one end of said image data transmitter being arranged in a predetermined two-dimensional geometrical shape, the ends of said plurality of fibers at the other end of said transmitter being arranged linearly;

image sensor means aligned with said linearly arranged ends of said optical fibers for detecting said brightness sensed by the image data transmitter means and producing an electrical signal indicative of the position of said object mark; and control means, responsive to said electrical signal, for transposing said object mark to a desired position.

4. A mark sensor device as claimed in claim 3, wherein said said predetermined two-dimensional geometrical shape is a square.

* * * * *